United States Patent [19]

Ross et al.

[11] Patent Number: 5,001,208

[45] Date of Patent: Mar. 19, 1991

[54] LINEAR POLYURETHANE ELASTOMER COMPOSITIONS BASED ON MIXED POLYCARBONATE AND POLYETHER POLYOLS

[75] Inventors: Bert A. Ross; John R. Damewood, both of Spartanburg, S.C.

[73] Assignee: Reeves Brothers, Inc., Spartanburg, S.C.

[21] Appl. No.: 326,865

[22] Filed: Mar. 20, 1989

[51] Int. Cl.$^5$ .................. C08G 18/10; C08G 18/44
[52] U.S. Cl. ........................ 528/61; 528/66; 528/76; 528/65
[58] Field of Search ............... 528/65, 66, 61, 76

[56] References Cited

U.S. PATENT DOCUMENTS

| | | | |
|---|---|---|---|
| Re. 31,671 | 9/1984 | Bonk et al. | 528/65 |
| 3,401,133 | 9/1968 | Grace et al. | 528/61 |
| 3,508,987 | 4/1970 | Burkley et al. | 156/99 |
| 3,539,424 | 11/1970 | Tasklick | 156/238 |
| 3,655,627 | 4/1972 | Hutzler et al. | 528/64 |
| 3,684,639 | 8/1972 | Keberle et al. | 156/331 |
| 3,758,443 | 9/1973 | Konig et al. | 260/75 NP |
| 3,764,457 | 10/1973 | Chang et al. | 161/183 |
| 3,823,051 | 7/1974 | Chang | 156/99 |
| 3,878,036 | 4/1975 | Chang | 428/424 |
| 3,883,571 | 5/1975 | Allport et al. | 260/453 AM |
| 3,886,102 | 5/1975 | Olstowski | 260/18 TN |
| 3,904,796 | 9/1975 | Zorn et al. | 528/61 |
| 3,935,132 | 1/1976 | Gerkin et al. | 260/2.5 BE |
| 4,031,026 | 6/1977 | Ibbotson | 252/182 |
| 4,072,634 | 2/1978 | Borchert et al. | 260/2.5 A |
| 4,088,616 | 5/1978 | Ichimura et al. | 260/2.5 AY |
| 4,115,429 | 9/1978 | Reiff et al. | 260/453 SP |
| 4,116,741 | 9/1978 | Thoma et al. | 428/423.3 |
| 4,118,411 | 10/1978 | Reiff et al. | 260/453 SP |
| 4,160,686 | 7/1979 | Niederdellman et al. | 156/331 |
| 4,229,347 | 10/1980 | Holt et al. | 260/239 A |
| 4,234,714 | 11/1980 | Earing et al. | 528/67 |
| 4,239,857 | 12/1980 | Harper | 521/160 |
| 4,261,852 | 4/1981 | Carroll et al. | 528/59 |
| 4,306,052 | 12/1981 | Bork et al. | 528/67 |
| 4,307,004 | 12/1981 | Schuhmacher et al. | 528/61 |
| 4,321,333 | 3/1982 | Alberino et al. | 521/121 |
| 4,334,034 | 6/1982 | Lehner et al. | 525/28 |
| 4,384,050 | 5/1983 | Guthrie | 521/137 |
| 4,384,051 | 5/1983 | Guthrie | 521/137 |
| 4,423,200 | 12/1983 | Ganster et al. | 528/67 |
| 4,435,527 | 3/1984 | Cuscurida et al. | 521/173 |
| 4,448,938 | 5/1984 | Bruynickx et al. | 525/457 |
| 4,463,141 | 7/1984 | Robinson | 525/467 |
| 4,476,293 | 9/1984 | Robinson | 528/76 |
| 4,478,960 | 10/1984 | Buethe et al. | 521/160 |
| 4,490,300 | 12/1984 | Allen et al. | 260/453 SP |
| 4,490,301 | 12/1984 | Pantone et al. | 260/453 SP |
| 4,490,302 | 12/1984 | Ma et al. | 260/453 SP |
| 4,533,729 | 8/1985 | Newland et al. | 528/371 |
| 4,539,156 | 9/1985 | Dewhurst et al. | 260/453 SP |
| 4,539,157 | 9/1985 | Dewhurst et al. | 260/453 SP |
| 4,539,158 | 9/1985 | Dewhurst et al. | 260/453 SP |
| 4,581,388 | 4/1986 | Rasshofer et al. | 521/159 |
| 4,581,470 | 4/1986 | Hoy et al. | 560/189 |
| 4,587,322 | 5/1986 | Rasshofer et al. | 528/60 |
| 4,621,105 | 11/1986 | Statton et al. | 521/107 |
| 4,634,743 | 1/1987 | Prier | 525/462 |
| 4,636,531 | 2/1987 | Schmidt | 528/60 |
| 4,647,596 | 3/1987 | Ishii et al. | 521/159 |
| 4,659,772 | 4/1987 | Hoy et al. | 524/755 |
| 4,663,417 | 5/1987 | Hunter et al. | 528/80 |
| 4,677,136 | 6/1987 | Rasshofer et al. | 521/159 |
| 4,683,171 | 7/1987 | Kuga et al. | 528/66 |
| 4,705,721 | 11/1987 | Frisch et al. | 528/66 |
| 4,727,094 | 2/1988 | Hoy et al. | 521/164 |
| 4,743,650 | 5/1988 | Boutni | 525/92 |
| 4,791,187 | 12/1988 | Süling et al. | 528/63 |
| 4,868,268 | 9/1988 | Muller et al. | 528/76 |

FOREIGN PATENT DOCUMENTS

| | | |
|---|---|---|
| 61-76275 | 4/1986 | Japan. |
| 61-151235 | 7/1986 | Japan. |
| 1382186 | 1/1975 | United Kingdom. |
| 1476268 | 6/1977 | United Kingdom. |

OTHER PUBLICATIONS

Starner et al., "New Prepolymer Chemistry Enhances Cast PU," Rubber and Plastics News, Oct. 19, 1987, pp. 28-30.

Primary Examiner—John Kight, III
Assistant Examiner—Dennis R. Daley
Attorney, Agent, or Firm—Pennie & Edmonds

[57] ABSTRACT

New linear polyurethane elastomers have been developed by combining a polycarbonate polyol, a polyether polyol, at least two extenders, and a solid diisocyanate compound. Preferably, the diisocyanate compound is modified by reaction with one of the extenders to form a modified diisocyanate component which is a liquid at room temperature prior to reaction with the polyols and other extender. These new elastomers possess a unique combination of hydrolytic stability, toughness, flexibility, and relatively low temperature processability.

27 Claims, No Drawings

LINEAR POLYURETHANE ELASTOMER COMPOSITIONS BASED ON MIXED POLYCARBONATE AND POLYETHER POLYOLS

TECHNICAL FIELD

This invention relates to novel linear thermoplastic polyurethane elastomers prepared from a polyol component of the combination of a polycarbonate polyol and a polyether polyol, at least two extender components, and a diisocyanate compound. Preferably, the diisocyanate compound is modified by reaction with one of the extenders to achieve a modified diisocyanate component prior to reaction with the other components.

BACKGROUND ART

In today's market, polyurethane elastomers are utilized in a wide array of products and applications, including producing industrial coated fabrics. For these latter, the polyurethanes are generally linear polymers exhibiting elastomeric characteristics of high tensile strength and elongation.

These linear polyurethanes are quite varied in their final properties as a result of the large number of permutations that can be applied to the three main components that are used in their manufacture. These components are polyols, polyisocyanates, and one or more extenders (generally diols). Some examples of these compounds are: polyether, polyester, polycaprolactone, polycarbonate, and polybutadiene polyols; toluene diisocyanate, 4,4'-diphenylmethane diisocyanate, cyclohexane diisocyanate, isophorone diisocyanate, naphthalene diisocyanate; xylene diisocyanate, hexane diisocyanate, and hydrogenated 4,4'-diphenylmethane diisocyanate; and 1,4-butanediol, 1,6-hexanediol, and 1,3-butanediol extenders.

Typically, polyurethane elastomers which are considered top of the line with respect to performance, include, for example, polytetramethylene glycol (polyether) polyurethanes and poly(butane adipates or hexane adipates) ester polyurethanes. Of these polymers, the polyether polyurethanes exhibit good hydrolytic stability and low temperature properties but are generally poor for fuel resistance and oxidation resistance, while the polyester polyurethanes are tough with good abrasion resistance, oxidation resistance and fuel resistance, but not particularly resistant to hydrolysis. Still, at the present time the polyesters are generally considered to represent the best compromise of physical properties and chemical resistance of the various polyurethanes.

There are also a few polyurethanes based on polycarbonate polyols in the market. It is well known that these polycarbonate polyurethanes have very good hydrolytic stability and generally have good to very good resistance to other degradation forces; however, they are usually too hard, rigid and brittle for use in industrial coated fabrics.

Currently, high performance coated fabrics are based on polyester polyurethanes in order to meet the specifications currently in effect, but resistance to hydrolysis remains their weak point and represents a problem for these products. Thus, there is a desire for improved hydrolytic stability in a number of applications. A polyurethane having improved hydrolytic properties and sufficient elastomeric character to be useful in the manufacturing of industrial coated fabrics is also desirable and needed.

It is known from Japanese Patent Specification Sho(61)-76275 that polyurethane elastomers can be produced from a diol mixture of a polyarbonate diol and a polyoxytetramethylene glycol, and/or a polydimethyl siloxane glycol; an organic diisocyanate and a chain extension compound. Practical Example 4 of Table I lists a porous polyurethane film formed from an 80/20 mixture of polycarbonate diol and polyoxytetra methylene glycol; 4,4'-diphenyl methane diisocyanate and 1,4-butylene glycol, while Practical Example 1 illustrates a film formed from a 50/25/25 mixture of polycarbonate diol/polyoxytetra methylene glycol/polydimethylsiloxane glycol; 4,4'-diphenyl methane diisocyanate and ethylene glycol. These porous films can be used in the manufacture of artificial leather or suede articles.

Also, Japanese Patent Specification Sho(61)-151235 discloses the preparation of aliphatic polycarbonate polyols from various mixtures of dialkyl carbonates and glycols. These polyols are described as having low color adhesion and smooth reactivity with isocyanates. Neither reference suggests that these materials can be used as or in the production of polyurethane elastomers for industrial coated fabrics.

SUMMARY OF THE INVENTION

The present invention relates to a linear thermoplastic polyurethane elastomer compositions comprising a mixture of a polycarbonate polyol and a polyether polyol; a diisocyanate compound; and first and second extenders. The diisocyanate compound is initially reacted with one of the extenders in a molar ratio of above 2:1 so as to form a modified diisocyanate component having a functionality of about 2 prior to reaction with the other components. This modified diisocyanate component provides relatively low temperature processing properties to the composition, whereas the polyol mixture provides superior hydrolytic stability and low temperature flexibility to the composition.

Preferably, the first extender component is a polyol or amine compound having a molecular weight of less than about 500, such as a diol, while the diisocyanate compound primarily comprises 4,4'-diphenyl methane diisocyanate. Advantageously, the first extender component is a polyol or amine compound having a molecular weight between about 60 and 250, such as 1,4-butane diol, tripropylene glycol, dipropylene glycol, propylene glycol, ethylene glycol, 1,6hexane diol, 1,3-butane diol, neopentyl glycol, ethylene diamine or mixtures thereof.

Generally, the polyether polyol and polycarbonate polyol are present in a relative amount of between 2:1 to 1:8. When the first extender is 1,4-butanediol and the second extender is tripropylene glycol, and when between about 10 to 30% by weight of the diisocyanate compound is modified, the modified diisocyanate component has an NCO content of between about 14 and 33%, preferably between about 20 and 26%. After modifying the diisocyanate, the modified material is reacted with the other components. The overall NCO/OH ratio of the entire composition is between about 0.95 and 1.05/1.

DETAILED DESCRIPTION OF THE INVENTION

One preferred embodiment of this invention relates to a polyurethane elastomer based on a mixture of polycarbonate and polyether polyols, a modified diisocyanate component formed by reacting a diisocyanate compound with a low molecular weight extender such as tripropylene glycol, and a second extender of 1,4-butanediol. The modified diisocyanate and the second extender enable the polymer to have low temperature processing properties compared to those wherein the diisocyanate is not modified. This polymer also has hydrolytic stability which is vastly superior to conventional polyester polyurethanes. This polymer also has elastomeric characteristics and other physical properties which render it suitable for use in coated fabric manufacturing processes and resultant products produced therefrom.

In this embodiment, the polyether polyol and polycarbonate polyol can be used in any relative amounts provided that each are present in the composition. It has been found convenient to use a polyether polyol: polycarbonate polyol ratio in the range of between 2:1 to 1:8.

Instead of tripropylene glycol and 1,4-butanediol, other low molecular weight extenders can be used. Generally, polyols having a molecular weight of between about 60 and 500 (and preferably less than 250) have been found to be advantageous, although amines such as ethylene diamine can also be used. Specific polyols include diols such as 1,3-butanediol, ethylene glycol, tripropylene glycol, dipropylene glycol, propylene glycol, and neopentyl glycol, triols such as trimethyol propane, as well as mixtures of these components, can be used.

Any diisocyanate compound is suitable with those based on 4,4'-diphenyl methane diisocyanate being preferred. Toulene diisocyanate, naphthalene diisocyanate, isophorone diisocyanate, xylene diisocyanate and cyclohexane diisocyanate can also be used, if desired, but these compounds are generally more expensive or slower reacting. Such diisocyanate compounds are converted to a modified diisocyanate component as previously described.

The relative amount of modified diisocyanate to polyol ranges from above 2:1 to 20:1, and preferably between about 2.5:1 and 8:1. The second extender compound is included in an amount to achieve a final NCO-:OH ratio of between about 0.95 to 1.05/1. The Examples illustrate preferred ratios of components for use in the preparation of linear polyurethanes in accordance with this invention.

Another preferred embodiment of the invention relates to the manufacture of any type of polyurethane elastomer prepared from the modified diisocyanate component to significantly lower the temperature requirements for processing the polyurethane on heat processing equipment, i.e., calenders, extruders, injection molding apparatus, etc. This modification includes reacting diisocyanate compound with a low molecular weight extender (i.e., polyol or amine compound, to form a modified diisocyanate component, prior to preparing the polyurethane with the other components.

The term "MDI" will be used throughout this application to designate diisocyanate compounds primarily based on 4,4'-diphenyl methane diisocyanate which are preferred for use in this invention. Also, the term "liquid MDI" will be used to designate an essentially difunctional modified MDI component prepared from the reaction of a low molecular weight polyol with an MDI compound to form a modified diisocyanate composition which is liquid at room temperature.

The low molecular weight extender used to modify the diisocyanate compound generally includes diols, triols or amines having a molecular weight below about 500, but any polyol which enables the diisocyanate compound to possess a functionality of about 2 and an NCO content of between about 14 and 33%, preferably between 20 and 26%, after modification, would be acceptable.

In this embodiment, essentially any polyol component can be used for reaction with the liquid MDI component, including polyether, polyester, polycaprolactone, polycarbonate or polybutadiane polyols or mixtures thereof. As noted above, a preferred polyol component is mixture of a polyether polyol and polycarbonate polyol.

It is also possible to add additional extenders to such compositions, these extenders also being a polyol or amine compound, preferably one of relatively low molecular weight (i.e., less than about 500). It is also possible to utilize unsaturated polyols as extenders, such as low molecular weight diols which include one or more double bonds. However, any conventional extender known to those skilled in the art can be used, depending upon the results desired.

Thus, the present invention demonstrates how various polycarbonate and polyether polyols, modified diisocyanate components and extenders may be blended over a wide range to allow the design of polyurethane polymers having different physical characteristics and properties. This makes it possible to custom design a polymer for a particular application.

There are several different types of modified MDIs presently on the market, but the types suitable for use in this invention are essentially difunctional. The preferred liquid MDI components are made by reacting an MDI compound with a small amount of a diol such as tripropylene glycol or a mixture of diols. The material resulting from this slight extension of the MDI compound is a liquid at room temperature while, as noted above, the original MDI compound is a solid at such temperatures. This makes the liquid MDI substantially easier to handle and process, while retaining generally equivalent performance to the unmodified MDI compound.

Representative modified liquid MDI components which are suitable and preferred for use in the present invention are disclosed in U.S. Pat. Nos. 3,883,571, 4,115,429, 4,118,411, 4,229,347, 4,490,300, 4,490,301, 4,539,156, 4,539,157, and 4,539,158: all these components are essentially difunctional and are obtained as the reaction product of MDI. With a diol or polyol having a molecular weight below about 500. To the extent necessary to understand this component of the inventive compositions, these patents are expressly incorporated herein by reference thereto. Those isocyanates having a functionality which is much greater than two are not particularly suitable for use in this invention, since they promote crosslinking rather than linearity in the resultant polyurethane polymer. The functionality of these compounds should be above 1.9 but below 2.2, with the preferred modified disocyanate components being those having a functionally of approximately 2 so as to facilitate the preparation of linear polyurethanes.

In the production of polyurethanes, it is generally known to utilize one of two different manufacutring processes. In one method, known as the "one-shot" approach, all hydroxyl bearing components (i.e., polyols and extender diols) are combined as a mixture, to which is added an isocyanate component in essentially stoichiometric quantities to form the final product. The second method contemplates the formation of a prepolymer by reacting excess isocyanate with one or more high molecular weight hydroxyl bearing components, followed by the reaction of this prepolymer with the extender to form the final product.

As noted above, the use of the modified diisocyanate components of this invention enables a polyurethane having lower temperature processing characteristics to be achieved. The temperature difference can be as great as 30° to 40° F. below that of a corresponding formulation wherein the diisocyanate compound is not modified. However, greater temperature reductions are achieved when the polyurethane is manufactured in a specific manner.

For example, if the polyurethanes of the invention are made by the conventional "one-shot" technique, a slight reduction on the order of about 3-4 degrees is obtained: this representing only about 10% of the maximum reduction which could be achieved. Similarly, if solid MDI is used to prepare an isocyanate prepolymer with the high molecular weight polyol prior to reacting this prepolymer with the mixed extenders, a temperature reduction of about 4-5 degrees (i.e., about 15% of the maximum) is achieved.

Substantial reductions in temperature processability of the resulting polyurethane can be achieved by following one of the following methods of manufacture. In one version, the isocyanate is pre-reacted with one of the extenders to form a modified isocyanate component prior to reaction with a mixture of the high molecular weight polyol and other extenders. This enables a temperature reduction of about 20 to 25 degrees to be achieved (i.e., about 60% of the optimum). Finally, the optimum temperature reduction is achieved by sequentially reacting the modified isocyanate component first with the high molecular weight polyol followed by reaction with the second extender. As noted above, a temperature reduction of 30 to 40 degrees is possible, with the formation of a clear polyurethane polymer.

Again, MDI, modified as disclosed herein, is the most advantageous diisocyanate for use in preparing the polyurethanes of this invention, although the other isocyanates mentioned above can instead be used, if desired. When light stability in a clear product is desired, an isophorone diisocyanate can be used to achieve better results than MDI. For a lower cost isocyanate component, toluene diisocyanate ("TDI") can be used, but it is less reactive than MDI. Thus, when TDI is used, amine extenders, rather than polyol or diol extenders, should be used. One skilled in the art can select the best combination of ingredients for any particular formulation.

These linear polyurethane elastomers are preferably made using a two step solution polymerization technique. Predried tolune, dimethyl formamide and the isocyanate are charged to a 3000 ml reactor (in some cases a 15,000 ml reactor was used). A given weight of polyol(s), the amount needed to achieve the desired prepolymer NCO/OH value, is dissolved in additional dry toluene. The reactor is then prepurged with dry nitrogen and maintained under a positive low pressure of dry nitrogen for the full reaction time.

The isocyanate containing solution is preheated to 65°-75° C. (depending on anticipated exotherm), and the solution of polyols is slowly added by a continuous stream (over one-half hour) to the reactor. The temperature is allowed to rise to 80°-90° C. (depending on system) and is maintained at this temperature for an additional two hours.

The desired extender diol is preweighed and dissolved in dry dimethyl formamide. The reactor is cooled to 60°-65° C. and two 7-10 gram samples of the reaction mixture are removed and analyzed for NCO content. The diol is then charged to the reactor, and the temperature raised (partly by the exotherm of extension) to 85°-90° C. and maintained at this temperature for two hours. A sample of the polymer is dried and an IR spectrum was run. If free NCO is detected in the spectrum, the reaction is continued for another hour.

The reaction solution is then allowed to cool to room temperature overnight and stored in a container until it can be tested. All mixtures were designed to yield a solution of 30% by weight of polymer dissolved in a 60/40 mixture of toluene/DMF.

This solution cooking technique provides an easy way of making this polymer, but it is difficult to evaluate the physical properties of such solutions. Thus, the solution collected from an individual cook is spread coated onto release paper and dried at 300° F. to remove the solvent. This film can then be stripped from the paper and used to conduct various physical property tests.

A. Modulus, Tensile Strength, and Elongation

One gram of cadmium stearate was added to 200 grams of dried polymer and intimately mixed on a two roll rubber mill. A 0.040 inch slab of polymer was removed from the mill and was used to make tensile specimens. This was done by pressing the slab between two polished plates in a heated Wabash press for 15 minutes at sufficient temperature and pressure to yield a 0.010-0.014 inch film. Temperatures and pressures varied depending upon the particular formulation. The press was cooled to room temperature and the film was removed from between the plates. From this film, five samples were cut in the size of one inch by six inches. These were then tested on an Instron and averages of 100% modulus, 200% modulus, tensile strength, and elongation were calculated from the test results. The temperature for the milling and pressing operations were observed and found to be related to formulation changes.

B. Toluene Swell

Two pieces, one inch by two inches, of the pressed film were immersed in toluene for 24 hours. Measurements of volume by displacement of alcohol before and after toluene immersion were used to calculate volume swell.

C. Flow Temperature and Flow Rate

A three to five gram sample of polymer was finely chopped and used to determine the temperature at which the polymer would flow at a measurable rate and to determine the rate itself on a Kayness, Inc. extrusion plastometer Model D-0051. A measurable rate was defined as greater than 0.15 grams per 10 minutes. Thus at temperatures below the flow temperature, neither fusion of the polymer nor flow greater than 0.15 grams is achieved. The flow rate is defined as the number of grams extruded from the barrel of the plastometer in a period of ten minutes.

D. Brookfield Viscosity

Fifteen grams of polymer were dissolved in 85 grams of dry dimethyl formamide and warmed to 30 degrees Centigrade in a constant temperature bath overnight in a closed waterproof container. The viscosity was then measured on a Brookfield viscometer as quickly as possible after removing from the bath. Viscosity data is reported in cps.

E. Glass Transition Temperature (Tg)

Several polymer slabs, including a known control, were measured for $T_g$. This work was done by two techniques, mechanical spectroscopy which measures the change in physical properties due to passing through the glass transition temperature and DSC (differential scanning calorimetry) which measures the second order transition defined as glass transition temperature.

The improvements and advantages associated with the linear polyurethane polymers developed in this invention are illustrated below in the Examples.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified. The specific preferred chemicals utilized in the examples are listed below as follows:

| POLYOLS | | | | |
|---|---|---|---|---|
| Supplier | Identity | Type | OH Number | Equiv. Wt. |
| PPG Industries | Duracarb 120 | aliphatic carbonate | 131.0 | 428.2 |
| PPG Industries | Duracarb 122 | aliphatic carbonate | 95.0 | 590.0 |
| PPG Industries | Duracarb 124 | aliphatic carbonate | 58.0 | 967.2 |
| QC Chemicals | Polymeg 1000 | PTMEG ether | 111.9 | 501.3 |
| QC Chemicals | Polymeg 2000 | PTMEG ether | 55.7 | 1007.2 |
| Whitco Chemical | Form-rez 44-112 | ester | 113.3 | 495.1 |

| ISOCYANATES | | | | |
|---|---|---|---|---|
| Supplier | Identity | Type | % NCO | Equiv. Wt. |
| ICI | Rubinate 44 | MDI | 33.6 | 125.0 |
| ICI | Rubinate LF-179 | liquid MDI | 23.0 | 182.5 |
| Mobay Corp. | Mondur PF | liquid MDI | 22.9 | 183.4 |
| BASF | Lupranate MP-102 | liquid MDI | 23.0 | 182.5 |
| Dow Chemical | Isonate 181 | liquid MDI | 23.0 | 182.5 |

| EXTENDER DIOLS | | |
|---|---|---|
| Supplier | Identity | Equivalent Weight |
| BASF | 1,4-butanediol | 45 |
| Dow Chemical | tripropylene glycol | 96 |

Examples 1-12

Table I (A and B) illustrates the effect that modified liquid MDI components have on flow temperature of various polyurethanes compared to those made from the corresponding unmodified MDI compound. The table lists six polyurethanes made with various polyols, including some mixtures of polyols. Each two examples represent a polyurethane made from liquid MDI and its analog made from the corresponding MDI unmodified, solid component. As shown in the table, the percent hard segment is equivalent in each comparison. Examples 1, 3, 5, 7, 9 and 11 are in accordance with the present invention, while Examples 2, 4, 6, 8, 10 and 12 are included for comparison. In all cases, the liquid MDI polymer has a lower flow temperature than its solid MDI analog. Flow temperature is that temperature at which a measurable flow is first observed when tested on an extrusion plastometer.

Since flow temperature is a measure of the temperature at which the polymer may be processed on calendering and extrusion equipment, the use of the liquid MDI components allows the making of polymers which process at lower temperatures, and therefore are easier to process and manufacture into articles such as calendered sheets for coated fabrics. The results demonstrate that all experimental polymers made with liquid MDI components exhibited lower milling temperatures than those of their solid MDI analogs.

Although Table I illustrates polyurethanes made with polyether, polyester, and polycarbonate polyols, it would be expected that this improvement would be present regardless of the specific type of polyol used.

Examples 13-16

The section on chemicals lists four commercially available liquid MDI components and describes how they are produced. Table II (A and B) demonstrates that these four isocyanates are essentially equivalent in their ability to modify the flow temperatures and therefore the processing temperatures of polyurethanes made from them. Any one of these four preferred isocyanates may be employed in the development of low temperature processable polyurethanes. As noted above, a wide variety of difunctional isocyanates which are modified by reaction with low molecular weight polyols would also be suitable for use in this invention.

Examples 17-22

Table III (A and B) compares polycarbonate polyurethanes made from liquid MDI components against those made with solid MDI components. Examples 17-19 are in accordance with the invention, while Examples 20-22 are comparative. It can be seen from the data that polyurethane polymers made using liquid MDI exhibit better physical properties, particularly tensile strength, compared to those made with solid MDI. Flow temperatures were not specifically measured on the liquid MDI polymers, but processing on the mill was found to be significantly better than for polymers made with the comparable unmodified, solid MDI compounds.

It should also be noted that the use of liquid MDI allows the production of polyurethane elastomers having a higher percent hard segment. This is advantageous because in general the urethane linkages are much more stable to various degradation forces (i.e. hydrolysis, oxidation, etc.) than are ether, ester or other bonds in the polyol backbone.

Examples 23-38

Polyurethane elastomers made from an aliphatic polycarbonate polyol, liquid MDI and 1,4-butanediol were prepared as shown in Table III, Examples 17-19. A mixture of polycarbonate polyols was used in Example 38 of table IV. Excellent physical properties, particularly tensile strength and elongation, were achieved in these formulations. Upon further analysis of the tensile curves, it was observed that these polymers were more plastic than elastomeric in character. Thus, these polymers could be described as hard and tough with a high yield value as illustrated by the 100% modulus values. However, evaluation of films of the polycarbonate based polyurethane polymers exhibited poor cold crack properties.

To improve low temperature properties without sacrificing the properties of the polycarbonate backbone, a copolyol was introduced into the system, as shown in Examples 23-37 of Tables IV (A and B). A polytetramethylene glycol ("PTMG") polyol was found to have the compatibility with the specific polycarbonate polyols used, with the molecular weight of 1000 and 2000 each found to be suitable.

From Table IV (B), it is observed that physical properties, i.e. modulus, elongation, tensile strength, and toluene swell are affected by percent weight secondary and by percent hard segment. Thus, as the percent of secondary polyol (PTMG polyether) is increased, (or the polycarbonate is decreased), modulus decreases and the polymer becomes more elastomeric than plastic. Also as the percent hard segment decreases, the modulus decreases but toluene swell (a measure of solvent resistance) increases. From this information, one skilled in the art can select the optimum combinations for the desired final product.

Two different molecular weight polyethers were evaluated. The results tend to indicate that change in properties is mainly related to the percent (by weight) of secondary polyol rather than to the molecular weight of the PTMG polyol. It is also observed that there is some lowering of tensile strength at higher percent secondary polyol, but at a weight ratio of primary/secondary polyol of greater than or equal to one, this is not significant. Increased molecular weight of these polymers can also be used to counteract this effect.

Examples 39 and 40

The ability to custom design a polymer to meet various physical requirements is suggested by the results of Table V. It is also possible to improve low temperature properties. Table V (A and B) compares two formulations which are similar with the exception of the introduction of 20% PTMG polyether polyol into the polymer (Example 40). Again the changes in physical properties can be observed.

The $T_g$ of the formulations of these examples was determined by mechanical spectrometry (M.S.) and differential scanning calorimetry (DSC) to be as follows:

| Polymer of Example | M.S. Tg (°C.) | DSC Tg (°C.) |
|---|---|---|
| 39 | 50.9-56.0 | 21 |
| 40 | 30.9 | 11 |

Thus the mixture of the PTMG polyether polyol with the polycarbonate polyol resulted in a significant lowering of the $T_g$ (in degrees Centigrade). Thus, this polyol mixture increases the cold cracking and low temperature impact properties of the resulting linear polyurethane polymer.

Examples 41-45

Table VI (A and B) illustrates the reproducibility of the invention by listing several formulations which were made at different times on different days.

Examples 46-48

As described above, most of the elastomers of the Examples were made using a solution polymerization technique and then dried for testing and experimental use. This technique is not a suitable process for use in commercial manufacturing, and other methods of polymerization can be used. One is to mix together the polyol(s) and diol(s) and then feed this stream with a stream of isocyanate to an intensive mixer. The two streams when mixed are heated to initiate polymerization and extruded as a polymer (one-shot). Another approach is to first make prepolymers from the polyol(s) using an excess of isocyanate and then to extend this material with the diol(s) in the presence of heat.

Two experiments were conducted in an attempt to simulate and evaluate these two approaches. In both cases, the formula of Example 40 was used. The one-shot experiment was conducted by weighing the polyols and diol into a plastic container and mixing well under nitrogen. The appropriate amount of LF-179 was then added, mixed well, capped under nitrogen and placed in an oven at 90° C. overnight. The prepolymer approach was conducted by mixing the polyols thoroughly with an excess of isocyanate (per formula), followed by capping and heating for two hours at 85° C. After removing the sample from the oven, an appropriate amount of diol was added, quickly mixed, capped and returned to a 90° C. oven overnight.

Table VII (A and B) gives a comparison of a solution cook to a one-shot and a prepolymer cook. In all cases, flow temperature is still lower than a comparable unmodified MDI polymer and physical properties are very similar. Working these polymers on a rubber mill indicates that the prepolymer approach may actually yield a lower temperature processing polymer than the one-shot approach. Also, the prepolymer approach provides a much clearer polymer which is a sign of better uniformity and compatibility. Therefore the prepolymer approach is preferred although the one-shot approach will indeed yield acceptable polymers and, it is seen that a new linear polyurethane elastomers useful for a wide variety of applications can be prepared.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

TABLE I(A)

| EXAMPLE | ISOCYA-NATE | PRIMARY POLYOL | FORMULATIONS SECONDARY POLYOL | EQUIV RATIO | WEIGHT RATIO | PREPOL NCO/OH | FINAL NCO/OH |
|---|---|---|---|---|---|---|---|
| 1 | LF-179 | DURACARB 120 | POLYMEG 2000 | 2.410 | 1.025 | 2.503 | 0.981 |
| 2 | MDI | DURACARB 120 | POLYMEG 2000 | 2.410 | 1.025 | 3.340 | 0.980 |
| 3 | LF-179 | DURACARB 120 | POLYMEG 2000 | 3.565 | 1.516 | 2.600 | 0.950 |
| 4 | MDI | DURACARB 120 | POLYMEG 2000 | 3.565 | 1.516 | 1.478 | 0.950 |
| 5 | LF-179 | POLYMEG 1000 | — | — | — | 2.377 | 0.950 |
| 6 | MDI | POLYMEG 1000 | — | — | — | 3.171 | 0.950 |
| 7 | LF-179 | DURACARB 122 | POLYMEG 2000 | 3.546 | 2.079 | 3.163 | 0.950 |
| 8 | MDI | DURACARB 122 | POLYMEG 2000 | 3.546 | 2.079 | 4.220 | 0.951 |
| 9 | LF-179 | DURACARB 124 | POLYMEG 2000 | 1.575 | 1.512 | 4.471 | 0.950 |
| 10 | MDI | DURACARB 124 | POLYMEG 2000 | 1.575 | 1.513 | 1.517 | 0.950 |
| 11 | LF-179 | FORM-REZ 44-112 | — | — | — | 1.970 | 0.980 |
| 12 | MDI | FORM-REZ 44-112 | — | — | — | 2.633 | 0.980 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE I(B)

| EXAMPLE | % WEIGHT PRIMARY | % WEIGHT SECONDARY | % HARD SEGMENT | 100% MODULUS | 200% MODULUS | TENSILE STRENGTH | PERCENT ELONGATION | TOLUENE SWELL | FLOW TEMP | FLOW RATE | BROOKFIELD VISCOSITY |
|---|---|---|---|---|---|---|---|---|---|---|---|
| 1 | 26.91 | 26.26 | 46.83 | 896 | 1354 | 4772 | 531 | 79.2 | 150 | 1.825 | 115 |
| 2 | 26.93 | 26.28 | 46.79 | 1696 | 1920 | 2550 | 412 | 69.6 | 195 | 9.400 | 57 |
| 3 | 30.19 | 19.92 | 49.89 | 1028 | 1746 | 5094 | 494 | 104.6 | 150 | 1.868 | 93 |
| 4 | 30.10 | 19.90 | 50.00 | 761 | 905 | 1324 | 496 | 79.0 | 160 | 7.686 | 27 |
| 5 | 50.00 | — | 50.00 | 626 | 787 | 1968 | 655 | 92.0 | 150 | 10.070 | 54 |
| 6 | 50.00 | — | 50.00 | * | * | 1300 | 77 | 60.0 | 186 | 5.924 | 27 |
| 7 | 33.80 | 16.30 | 49.90 | 1082 | 1697 | 3745 | 413 | 105.0 | 150 | 6.158 | 42 |
| 8 | 33.80 | 16.20 | 50.00 | 1878 | * | 1911 | 148 | 62.3 | 194 | 1.555 | 34 |
| 9 | 30.10 | 19.90 | 50.00 | 1198 | 1707 | 3732 | 439 | 100.0 | 160 | 4.284 | 56 |
| 10 | 30.10 | 19.90 | 50.00 | 1740 | * | 1731 | 112 | 80.4 | 210 | 5.662 | 28 |
| 11 | 55.00 | — | 45.00 | 555 | 810 | 6928 | 579 | 51.4 | 175 | 7.578 | 254 |
| 12 | 55.00 | — | 45.00 | 1553 | 1885 | 3604 | 554 | 43.2 | 179 | 18.060 | 53 |

*Property Not Measured

TABLE II(A)

| EXAMPLE | ISOCYA-NATE | PRIMARY POLYOL | FORMULATIONS SECONDARY POLYOL | EQUIV RATIO | WEIGHT RATIO | PREPOL NCO/OH | FINAL NCO/OH |
|---|---|---|---|---|---|---|---|
| 13 | LF-179 | DURACARB 120 | POLYMEG 2000 | 3.681 | 1.565 | 2.618 | 0.952 |
| 14 | ISO.181 | DURACARB 120 | POLYMEG 2000 | 3.558 | 1.512 | 2.606 | 0.951 |
| 15 | MP-102 | DURACARB 120 | POLYMEG 2000 | 3.558 | 1.512 | 2.606 | 0.950 |
| 16 | MON PF | DURACARB 120 | POLYMEG 2000 | 3.558 | 1.512 | 2.606 | 0.950 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE II(B)

| EXAMPLE | % WEIGHT PRIMARY | % WEIGHT SECONDARY | % HARD SEGMENT | 100% MODULUS | 200% MODULUS | TENSILE STRENGTH | PERCENT ELONGATION | TOLUENE SWELL | FLOW TEMP | FLOW RATE | BROOKFIELD VISCOSITY |
|---|---|---|---|---|---|---|---|---|---|---|---|
| 13 | 30.38 | 19.41 | 50.21 | 1239 | 2066 | 5649 | 478 | 112.5 | 150 | 1.739 | 82 |
| 14 | 30.10 | 19.90 | 50.00 | 1057 | 1598 | 3962 | 492 | 94.0 | 150 | 4.990 | 55 |
| 15 | 30.10 | 19.90 | 50.00 | 1093 | 1638 | 4239 | 504 | 85.0 | 150 | 1.815 | 121 |
| 16 | 30.10 | 19.90 | 50.00 | 1057 | 1776 | 5668 | 507 | 90.0 | 160 | 2.436 | 111 |

TABLE III(A)

| EXAMPLE | ISOCYANATE | FORMULATIONS POLYOL | PREPOL NCO/OH | FINAL NCO/OH |
|---|---|---|---|---|
| 17 | LF-179 | DURACARB 120 | 2.477 | 0.992 |
| 18 | LF-179 | DURACARB 120 | 2.477 | 0.992 |
| 19 | LF-179 | DURACARB 120 | 2.477 | 0.992 |

TABLE III(A)-continued

| EXAMPLE | FORMULATIONS ISOCYANATE | POLYOL | PREPOL NCO/OH | FINAL NCO/OH |
|---|---|---|---|---|
| 20 | MDI | DURACARB 120 | 2.475 | 0.990 |
| 21 | MDI | DURACARB 120 | 2.700 | 0.990 |
| 22 | MDI | DURACARB 120 | 2.901 | 0.990 |

Note: Each formulation contains 1,4-butane diol as an extender as necessary to achieve the final NCO/OH ratio.

TABLE III(B)

| EXAMPLE | % WEIGHT PRIMARY | % HARD SEGMENT | 100% MODULUS | 200% MODULUS | TENSILE STRENGTH | PERCENT ELONGATION | TOLUENE SWELL | FLOW TEMP | FLOW RATE | BROOKFIELD VISCOSITY |
|---|---|---|---|---|---|---|---|---|---|---|
| 17 | 45.19 | 54.81 | 2605 | * | 6739 | 297 | 68.0 | ** | * | * |
| 18 | 45.19 | 54.81 | 2086 | * | 6100 | 351 | 53.0 | ** | * | * |
| 19 | 45.19 | 54.81 | 1924 | * | 5904 | 367 | 54.0 | ** | * | * |
| 20 | 53.19 | 46.81 | 1398 | * | 2528 | 304 | 78.0 | 160 | 12.620 | 36 |
| 21 | 50.76 | 49.24 | 2372 | 3515 | 4469 | 304 | 78.0 | 160 | 12.620 | 36 |
| 22 | 48.79 | 51.21 | 2927 | 3909 | 4763 | 288 | 48.5 | 175 | 17.390 | 40 |

*Property not measured
**Flow temperature not specifically measured but visually observed to be lower (on the order of about 150 F) compared to that of Examples 20-22.

TABLE IV(A)

| EXAMPLE | FORMULATIONS ISOCYANATE | PRIMARY POLYOL | SECONDARY POLYOL | EQUIV RATIO | WEIGHT RATIO | PREPOL NCO/OH | FINAL NCO/OH |
|---|---|---|---|---|---|---|---|
| 23 | LF-179 | DURACARB 120 | POLYMEG 1000 | 8.988 | 7.677 | 2.480 | 0.977 |
| 24 | LF-179 | DURACARB 120 | POLYMEG 2000 | 8.996 | 3.949 | 2.480 | 0.977 |
| 25 | LF-179 | DURACARB 120 | POLYMEG 1000 | 3.995 | 3.412 | 2.479 | 0.977 |
| 26 | LF-179 | DURACARB 120 | POLYMEG 1000 | 2.999 | 2.562 | 2.475 | 0.980 |
| 27 | LF-179 | DURACARB 120 | POLYMEG 1000 | 2.999 | 2.562 | 2.475 | 0.980 |
| 28 | LF-179 | DURACARB 120 | POLYMEG 1000 | 2.327 | 1.988 | 2.481 | 0.977 |
| 29 | LF-179 | DURACARB 120 | POLYMEG 1000 | 2.334 | 1.993 | 2.099 | 0.980 |
| 30 | LF-179 | DURACARB 120 | POLYMEG 1000 | 1.498 | 1.280 | 2.478 | 0.977 |
| 31 | LF-179 | DURACARB 120 | POLYMEG 2000 | 2.410 | 1.025 | 2.826 | 0.983 |
| 32 | LF-179 | DURACARB 120 | POLYMEG 1000 | 0.999 | 0.853 | 2.478 | 0.977 |
| 33 | LF-179 | DURACARB 120 | POLYMEG 2000 | 2.333 | 1.025 | 2.481 | 0.977 |
| 34 | LF-179 | DURACARB 120 | POLYMEG 2000 | 2.333 | 1.025 | 2.481 | 0.977 |
| 35 | LF-179 | DURACARB 120 | POLYMEG 2000 | 2.410 | 1.025 | 2.503 | 0.981 |
| 36 | LF-179 | DURACARB 120 | POLYMEG 2000 | 2.410 | 1.025 | 2.120 | 0.984 |
| 37 | LF-179 | DURACARB 120 | POLYMEG 2000 | 1.032 | 0.439 | 2.520 | 0.983 |
| 38 | LF 179 | DURACARB 120 | DURACARB 122 | 1.000 | 0.725 | 2.475 | 0.990 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE IV(B)

| EXAMPLE | % WEIGHT PRIMARY | % WEIGHT SECONDARY | % HARD SEGMENT | 100% MODULUS | 200% MODULUS | TENSILE STRENGTH | PERCENT ELONGATION | TOLUENE SWELL | FLOW TEMP | FLOW RATE | BROOKFIELD VISCOSITY |
|---|---|---|---|---|---|---|---|---|---|---|---|
| 23 | 40.25 | 5.24 | 54.51 | 2256 | 3262 | 6386 | 362 | 68.0 | 160 | 3.850 | 79 |
| 24 | 38.36 | 9.71 | 51.93 | 1799 | 3155 | 6644 | 355 | 106.0 | 150 | 1.039 | 104 |
| 25 | 35.51 | 10.41 | 54.08 | 1808 | 2917 | 6573 | 386 | 88.0 | 150 | 1.720 | 84 |
| 26 | 33.22 | 12.97 | 53.81 | 1947 | 3193 | 7284 | 371 | 76.0 | 150 | 0.821 | 227 |
| 27 | 33.22 | 12.97 | 53.81 | 1704 | 3055 | 7294 | 374 | 72.0 | 150 | 0.750 | 63 |
| 28 | 30.81 | 15.50 | 53.69 | 1068 | 2321 | 5846 | 388 | 91.0 | 150 | 5.232 | 63 |
| 29 | 33.88 | 17.00 | 49.12 | 625 | 1466 | 6452 | 439 | 123.0 | 150 | 2.495 | 141 |
| 30 | 26.24 | 20.50 | 53.26 | 732 | 1536 | 5542 | 450 | 79.0 | 150 | 5.272 | 51 |
| 31 | 25.26 | 24.65 | 50.09 | 1243 | 2088 | 6563 | 521 | 81.0 | 160 | 1.790 | 217 |
| 32 | 21.70 | 25.43 | 52.87 | 1071 | 1705 | 4388 | 463 | 77.0 | 150 | 7.580 | 70 |
| 33 | 26.91 | 26.26 | 46.83 | 844 | 1284 | 5803 | 579 | 100.0 | 150 | 0.980 | 153 |
| 34 | 26.91 | 26.26 | 46.83 | 867 | 1354 | 6041 | 558 | 96.0 | 150 | 0.905 | 188 |
| 35 | 26.91 | 26.26 | 46.83 | 896 | 1354 | 4772 | 531 | 79.2 | 150 | 1.825 | 115 |
| 36 | 29.19 | 28.49 | 42.32 | 489 | 712 | 5362 | 612 | 164.0 | 160 | 2.313 | 229 |
| 37 | 17.50 | 39.86 | 42.64 | 520 | 684 | 3170 | 683 | 148.0 | 150 | 2.792 | 99 |
| 38 | 20.8 | 28.7 | 50.4 | * | * | * | * | 105.0 | 150 | 1.608 | 134 |

*Property Not Measured

TABLE V(A)

| EXAMPLE | ISOCYANATE | PRIMARY POLYOL | FORMULATIONS SECONDARY POLYOL | EQUIV RATIO | WEIGHT RATIO | PREPOL NCO/OH | FINAL NCO/OH |
|---|---|---|---|---|---|---|---|
| 39 | LF-179 | DURACARB 120 | — | — | — | 2.477 | 0.992 |
| 40 | LF-179 | DURACARB 120 | POLYMEG 2000 | 3.565 | 1.516 | 2.600 | 0.950 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE V(B)

| EXAMPLE | % WEIGHT PRIMARY | % WEIGHT SECONDARY | % HARD SEGMENT | 100% MODULUS | 200% MODULUS | TENSILE STRENGTH | PERCENT ELONGATION | TOLUENE SWELL | FLOW TEMP | FLOW RATE | BROOKFIELD VISCOSITY |
|---|---|---|---|---|---|---|---|---|---|---|---|
| 39 | 45.19 | — | 54.81 | 2086 | * | 6100 | 351 | 53.0 | * | * | * |
| 40 | 30.19 | 19.92 | 49.89 | 1028 | 1746 | 5094 | 494 | 104.6 | 150 | 1.686 | * |

*Property not measured

TABLE VI(A)

| EXAMPLE | ISOCYANATE | PRIMARY POLYOL | FORMULATIONS SECONDARY POLYOL | EQUIV RATIO | WEIGHT RATIO | PREPOL NCO/OH | FINAL NCO/OH |
|---|---|---|---|---|---|---|---|
| 41 | LF-179 | DURACARB 120 | POLYMEG 2000 | 2.333 | 1.025 | 2.481 | 0.977 |
| 42 | LF-179 | DURACARB 120 | POLYMEG 2000 | 2.333 | 1.025 | 2.481 | 0.977 |
| 43 | LF-179 | DURACARB 120 | POLYMEG 2000 | 2.410 | 1.025 | 2.503 | 0.981 |
| 44 | LF-179 | DURACARB 120 | POLYMEG 2000 | 3.565 | 1.516 | 2.600 | 0.950 |
| 45 | LF-179 | DURACARB 120 | POLYMEG 2000 | 3.565 | 1.516 | 2.600 | 0.950 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE VI(B)

| EXAMPLE | % WEIGHT PRIMARY | % WEIGHT SECONDARY | % HARD SEGMENT | 100% MODULUS | 200% MODULUS | TENSILE STRENGTH | PERCENT ELONGATION | TOLUENE SWELL | FLOW TEMP | FLOW RATE | BROOKFIELD VISCOSITY |
|---|---|---|---|---|---|---|---|---|---|---|---|
| 41 | 26.91 | 26.26 | 46.83 | 867 | 1354 | 6041 | 558 | 96.0 | 150 | 0.905 | 188 |
| 42 | 26.91 | 26.26 | 46.83 | 844 | 1284 | 5803 | 579 | 100.0 | 150 | 0.980 | 153 |
| 43 | 26.91 | 26.26 | 46.83 | 896 | 1354 | 4772 | 531 | 79.2 | 150 | 1.825 | 115 |
| 44 | 30.19 | 19.92 | 49.89 | 1072 | 1824 | 5405 | 488 | 92.3 | 150 | 1.440 | 105 |
| 45 | 30.19 | 19.92 | 49.89 | 1028 | 1746 | 5094 | 494 | 104.6 | 150 | 1.868 | 93 |

TABLE VII(A)

| EXAMPLE | ISOCYANATE | PRIMARY POLYOL | FORMULATIONS SECONDARY POLYOL | EQUIV RATIO | WEIGHT RATIO | PREPOL NCO/OH | FINAL NCO/OH |
|---|---|---|---|---|---|---|---|
| 46 | LF-179 | DURACARB 120 | POLYMEG 2000 | 3.565 | 1.516 | 2.600 | 0.950 |
| 47 | LF-179 | DURACARB 120 | POLYMEG 2000 | 3.565 | 2.079 | 2.600 | 0.950 |
| 48 | LF-179 | DURACARB 120 | POLYMEG 2000 | 3.565 | 2.079 | 2.600 | 0.950 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE VII(B)

| EXAMPLE | % WEIGHT PRIMARY | % WEIGHT SECONDARY | % HARD SEGMENT | 100% MODULUS | 200% MODULUS | TENSILE STRENGTH | % ELONGATION | TOLUENE SWELL | FLOW TEMP | FLOW RATE | BROOKFIELD VISCOSITY |
|---|---|---|---|---|---|---|---|---|---|---|---|
| 46 | 30.19 | 19.92 | 49.89 | 1028 | 1746 | 5094 | 494 | 104.6 | 150 | 1.868 | 93 |
| 47 | 30.20 | 19.90 | 49.90 | 915 | 1691 | 4885 | 442 | 115.0 | 160 | 2.207 | 202 |
| 48 | 30.20 | 19.90 | 49.90 | 1144 | 2342 | 6634 | 409 | 105.0 | 160 | 1.111 | 373 |

What is claimed is:

1. A linear thermoplastic polyurethane elastomer composition comprising:
a polycarbonate polyol;
a polyether polyol;
a diisocyanate compound;

a first extender component; and a second extender component;

wherein the diisocyanate compound is initially reacted with one of the extender components in a molar ratio of above 2:1 so as to form a modified diisocyanate component having a functionality of about 2 prior to reaction with the other components to provide relatively low temperature processing properties to the composition, whereas the polyol component provides superior hydrolytic stability and low temperature flexibility properties to the composition.

2. The composition of claim 1 wherein the first extender component is a polyol or amine compound having a molecular weight of less than about 500.

3. The composition of claim 3 wherein the first extender component comprises a diol.

4. The composition of claim 1 wherein the diisocyanate compound primarily comprises 4,4'-diphenyl methane diisocyanate.

5. The composition of claim 1 wherein the first extender component is a polyol having a molecular weight between about 60 and 250.

6. The composition of claim 1 wherein at least one of the extender components comprises 1,4-butane diol, tripropylene glycol, dipropylene glycol, propylene glycol, ethylene glycol, 1,6-hexane diol, 1,3-butane diol, neopentyl glycol, ethylene diamine or mixtures thereof.

7. The composition of claim 1 wherein the polyether polyol and polycarbonate polyol are present in the polyol component in a relative amount of between 2:1 to 1:8.

8. The composition of claim 1 wherein one extender component comprises 1,4-butanediol and the other extender component comprises tripropylene glycol.

9. The composition of claim 1 wherein between about 10 to 30% by weight of the diisocyanate compound is modified so that the modified diisocyanate component has an NCO content of between about 14 and 33%.

10. The composition of claim 9 wherein the NCO content of the modified diisocyanate component is between about 20 and 26%.

11. A linear thermoplastic polyurethane elastomer composition comprising:

a mixed polyol component comprising a polycarbonate polyol in an amount sufficient to impart hydrolytic stability to the composition and a polyether polyol in an amount sufficient to improve the low temperature impact properties to the composition;

a diisocyanate compound;

a first extender component; and a second extender component;

wherein each of the extender components is a polyol or amine compound having a molecular weight of less than about 500, and the diisocyanate compound is modified by reaction with one of the extender components in a molar ratio of above 2:1 so as to form a modified diisocyanate component having a functionality of about 2 prior to reaction with the remaining components, said extender components providing relatively low temperature processing properties to the composition.

12. The composition of claim 11 wherein the diisocyanate compound primarily comprises 4,4'- diphenylmethane diisocyanate.

13. The elastomer of claim 11 wherein the polyether polyol and polycarbonate polyol are present in a relative amount of between 2:1 to 1:8.

14. The composition of claim 11 wherein each of the extender components is a polyol having a molecular weight of between about 60 and 250.

15. The composition of claim 11 wherein the first extender component is a polyol having a molecular weight between about 60 and 250.

16. A linear thermoplastic polyurethane elastomer composition comprising:

a mixed polyol component comprising a polycarbonate polyol in an amount sufficient to impart hydrolytic stability to the composition and a polyether polyol in an amount sufficient to improve the low temperature impact properties of the composition;

a diisocyanate compound comprising 4,4,diphenylmethane diisocyanate;

a first extender component; and a second extender component;

wherein each extender component is a polyol or amine compound having a molecular weight of less than about 500, and the diisocyanate compound is modified by reaction with one of the extender components in a molar ratio of above 2:1 so as to form a modified diisocyanate component having a functionality of about 2 and an NCO content of between about 14 and 33% prior to reaction with the remaining components, said extender components providing relatively low temperature processing properties to the composition.

17. The elastomer of claim 16 wherein the polyether polyol and polycarbonate polyol are present in a relative amount of between 2:1 to 1:8.

18. The composition of claim 17 wherein each of the extender components is a polyol or amine compound having a molecular weight of between about 60 and 250.

19. The composition of claim 18 wherein the NCO content of the modified diisocyanate component is between about 20 and 26%.

20. The composition of claim 19 wherein one 25 extender component comprises 1,4-butanediol and the other extender component comprises tripropylene glycol.

21. The composition of one of claims 1, 11 or 16 wherein the modified diisocyanate compound is sequentially reacted first with the polyol and then with the other extender, with the relative amount of modified diisocyanate to polyol ranging from above about 2:1 to 20:1 and the other extender being included in an amount of to achieve a final NCO:OH ratio of between 0.95/1 and 1.05/1.

22. A linear thermoplastic polyurethane composition consisting essentially of:

a mixed polyol component comprising a polycarbonate polyol in an amount sufficient to impart hydrolytic stability to the composition and a polyether polyol in an amount sufficient to improve the low temperature impact properties of the composition, the polyether polyol and polycarbonate polyol being present in a relative amount of between 2:1 to 1:8;

a diisocyanate compound comprising 4,4'- diphenylmethane diisocyanate;

a first extender component; and a second extender component;

wherein each extender is a polyol or amine compound having a molecular weight of less than about 500, and the diisocyanate compound is modified by reaction with the first extender component in a molar ratio of above 2:1 so as to form a modified diisocyanate compound having a functionality of about 2 and a NCO content of between about 14 and 33% prior to the sequential reaction of the modified diisocyanate first with the polyol and then with second extender component, said extender components providing relatively low temperature processing properties to the composition.

23. The composition of claim 22 wherein the first extender component is a polyol or amine compound having a molecular weight of between 60 and 250.

24. The composition of claim 23 wherein the second extender component is a polyol or amine compound having a molecular weight of between 60 and 250.

25. The composition of claim 24 wherein one extender component comprises 1,4-butanediol ad the other extender component comprises tripropylene glycol.

26. The composition of claim 25 wherein the polycarbonate polyol has an equivalent weight of between about 428.2 and 967.2 and the polyether polyol has a molecular weight of between about 501.3 and 1007.2.

27. The composition of claim 26 wherein the relative amount of modified diisocyanate to polyol ranges from above about 2:1 to 20:1 and the second extender is included in an amount to achieve a final NCO:OH ratio of between about 0.95/1 and 1.05/1.

* * * * *